United States Patent [19]

Schultz

[11] 4,432,116

[45] Feb. 21, 1984

[54] CASTER SHIMMY DAMPER INCLUDING A VISCOUS DAMPING MEDIUM

[75] Inventor: John C. Schultz, Buffalo, N.Y.

[73] Assignee: Houdaille Industries, Inc., Ft. Lauderdale, Fla.

[21] Appl. No.: 514,852

[22] Filed: Jul. 19, 1983

Related U.S. Application Data

[63] Continuation of Ser. No. 251,064, Apr. 6, 1981, abandoned.

[51] Int. Cl.³ .............................................. B60B 33/00
[52] U.S. Cl. ..................................... 16/35 D; 29/434
[58] Field of Search ..................... 16/35 D, DIG. 42; 188/290; 29/434, 436; 192/50 R, 50 B

[56] References Cited

U.S. PATENT DOCUMENTS

| | | | |
|---|---|---|---|
| 2,661,917 | 12/1953 | O'Connor et al. | 16/35 D |
| 3,006,627 | 10/1961 | Paulsen | 267/57.1 |
| 3,228,494 | 1/1966 | Rumsey | 188/90 |
| 3,566,433 | 3/1971 | Lewin | 16/44 |

FOREIGN PATENT DOCUMENTS

| | | |
|---|---|---|
| 835426 | 5/1960 | United Kingdom . |
| 996867 | 6/1965 | United Kingdom . |
| 1469402 | 6/1977 | United Kingdom . |

*Primary Examiner*—Fred A. Silverberg
*Attorney, Agent, or Firm*—Hill, Van Santen, Steadman & Simpson

[57] ABSTRACT

A viscous rotary damper adapted to attenuate shimmy of a rotary member such as a caster relative to an associated member such as a wheelchair leg, comprises a pair of relatively rotatable annular portions having structure for respective attachment to the members. The damper portions have annular cooperative working surfaces of substantial length defining therebetween a shear film space gap working chamber which is closed at opposite ends by dynamic seals and has a viscous damping medium substantially filling the working chamber gap and providing viscous shear coupling yieldably resisting relative rotary movements of the working surfaces. The damper is adapted to be in a miniaturized form comprising a stator ring and a rotor housing, the stator ring being arranged to be keyed to one of relatively rotary members and the rotor being arranged to be keyed to the other of relatively rotary members.

6 Claims, 5 Drawing Figures

CASTER SHIMMY DAMPER INCLUDING A VISCOUS DAMPING MEDIUM

This application is a continuation of application Ser. No. 251,064, filed Apr. 6, 1981 now abandoned.

BACKGROUND OF THE INVENTION

1. Field of the Invention

This invention relates to damping shimmy of a rotary member relative to an associated member and is more particularly concerned with controlling and avoiding shimmy of casters of tye type which may be used in supporting wheelchairs, pushcarts, and the like.

By way of example, conveyances such as wheelchairs, pushcarts, and the like, may be run over hard surfaces, e.g. hospital corridors, where shimmying of the caster wheels may generate undesirable noise. Casters for such purposes are generally fairly small. The yokes for such casters may be on the order of 1½" outside spread dimension, and the swivel axles may be on the order of about ½" diameter of less and on the order of three times as long as the diameter. Therefore, equipping such casters with shimmy attenuating means involves a substantial problem in miniaturization.

Large size shimmy dampers have heretofore been employed for aircraft landing wheel assemblies, as represented in U.S. Pat. No. 2,661,917 employing the principle of torque resistance of shear films of a suitable viscous fluid operating between opposed parallel radially extending working surfaces relatively rotatably movable in their respective planes and wherein certain of the working surfaces are attached to a landing wheel strut and other of the surfaces to a wheel yoke. In such landing wheel assemblies there is ample room for the diameter to which the damper may extend and the lateral projection of the damper was found useful in effecting scissors connection between the strut and the yoke.

Also useful in the airplane industry, flutter dampers such as represented in U.S. Pat. No. 3,228,494 have employed the shear film principle, utilizing axially extending complementary shear film spaced working surfaces on relatively rotatable members one of which may be attached to a relatively fixed part of the aircraft and the other attached to a relatively movable control surface in the wing or tail assembly for eliminating flutter. In this instance, as in the foregoing prior art example, relatively larger damper units are involved.

SUMMARY OF THE INVENTION

A principal object of the present invention is to make use of the shear film principle within the necessarily miniature confines to which shimmy dampers must generally be limited for attenuating shimmy in casters on the order of those used on wheelchairs, or the like.

Another object of the present invention is to provide for damping wheelchair caster shimmy and which will not inhibit castering capability but permit 360° caster rotation, which will be inexpensive, which will require little or no modification in existing caster structure, which is adaptable for optional attachment, and which will avoid interference with folding or storage of the associated wheelchair.

For the attainment of the foregoing objects, the present invention provides in a damper for attenuating shimmy of a caster relative to a caster-supported member to which the caster is mounted for swiveling about a vertical axis: a first damper portion arranged to be fixed against rotation with respect to the caster-supported member, said first damper portion having an annular elongate first working surface of substantial length and arranged to be coaxial with said axis; a second damper portion arranged to be corotative with the caster, and having an annular elongate second working surface complementary to and facing toward said working surface of said first damper portion; said working surfaces being spaced apart in limited working chamber gap relation; a viscous damping medium substantially filling said working chamber gap and providing a viscous shear coupling for yieldably resisting relative rotary movements of said working surfaces; and dynamic sealing means closing the opposite ends of said gap.

The invention also provides a method of attenuating shimmy of a caster relative to a caster-supported member to which the caster is mounted for swiveling about a vertical axis: providing a first damper portion and fixing it against rotation with respect to the caster supported member, and with an annular elongate first working surface of said first damper portion coaxial with respect to said axis, providing a second damper portion corotative with the caster, and with an annular elongate second working surface of the second damper portion cooperatively related to said working surface of said first damper portion in limited spaced working chamber gap relation; substantially filling said working chamber gap with a viscous damping medium and thereby providing a viscous shear coupling for yieldably resisting relative rotary movements of said working surfaces; and dynamically sealing the opposite ends of said working chamber gap.

BRIEF DESCRIPTION OF THE DRAWINGS

Other objects, features and advantages of the present invention will be readily apparent from the following description of certain representative embodiments thereof, taken in conjunction with the accompanying drawing, although variations and modifications may be effected without departing from the spirit and scope of the novel concepts embodied in the disclosure and in which.

DETAILED DESCRIPTION OF THE PREFERRED EMBODIMENTS

Figure 1:
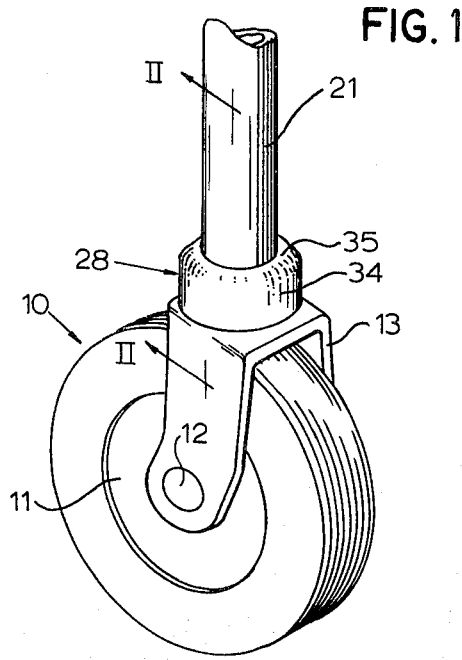
FIG. 1 is a perspective view of a caster assembly embodying the invention.
Figure 2:
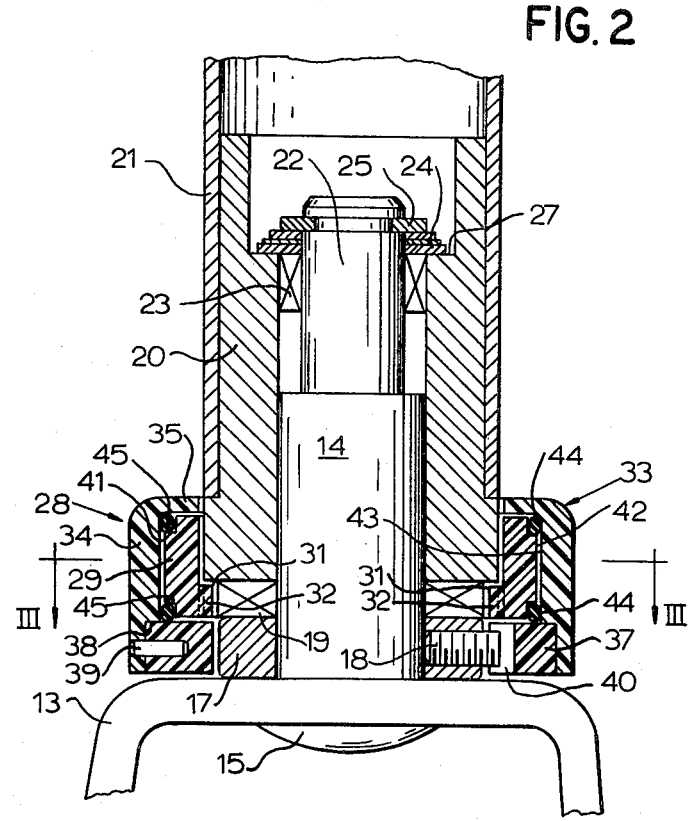
FIG. 2 is an enlarged fragmentary vertical sectional detail view taken substantially in the plane of line II—II of FIG. 1.

As shown in FIG. 1, a representative caster 10 includes a tired wheel 11 rotatably attached by means of an axle 12 within a yoke 13 carrying fixedly attached to the top of the yoke an upstanding axle 14 (FIG. 2) which may be secured to the yoke as by means of a riveted securement 15. In the illustrated instance, a thrust base collar 17 is engaged about the base of the axle 14, resting against the top of the yoke 13 and secured corotatably with the axle 14 by means of a set screw 18 threaded radially through the collar into engagement with the axle. A thrust bearing 19 engaged on the collar 17 supports the lower end of a tubular bushing 20 which is rotatably engaged about the axle 14 and is pressfitted or otherwise secured within the lower end portion of a tubular strut or leg 21, such as a wheelchair leg. On its upper end portion the axle 14 has a reduced diameter head portion 22 about which is mounted a radial bearing 23. Retention of the caster assembly with the bushing 20 is effected by means of a washer assembly 24 locked to the axle head portion 22 as by means of a snap ring 25 and engaging upon an upwardly facing annular shoulder 27 on the bushing 20. Through this arrangement, the caster 10 is adapted to swivel freely about a vertical axis on and relative to the supported member 21.

Figure 3:
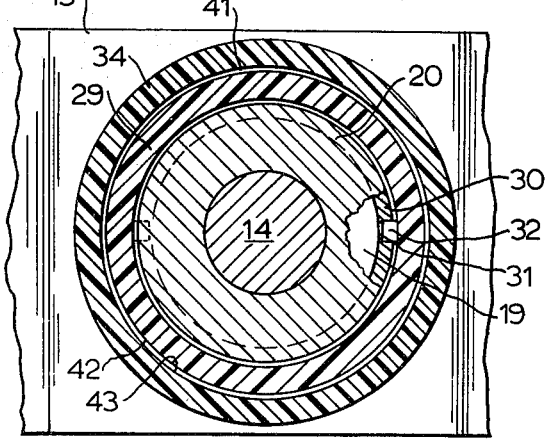
FIG. 3 is a horizontal sectional detail view taken substantially along the line III—III of FIG. 2.

According to the present invention, any tendency for the caster 10 to shimmy relative to the member 21 is attenuated by means of a damper 28 in the form of a small size annular axially elongate assembly connected concentrically to and between the caster 10 and the member 21. For this purpose, the damper 28 has a ring-shaped portion 29 arranged to be fixed as a stator with respect to the caster-supported member 21. Desirably, the stator ring 29 is engaged about the lower end portion of the bushing 20 which projects downwardly from the lower end of the tubular member 21 and has a downwardly projecting annular skirt flange 30 about the thrust bearing 19 (FIG. 3). At suitable circumferential intervals, such as at diametrically opposite points, the flange 30 has keying notches 31 within which are received complementary radially inwardly projecting key lugs 32 on the lower inner portion of the stator ring 29. Thereby the stator ring 29 is held fixed against rotation relative to the bushing 20 and the tubular member 21.

Mounted about and defining an annular cavity in which the stator ring 29 is housed is a second damper portion 33 comprising a rotor having an annular part 34 of generally inverted "L" shaped cross section provided with a vertical body extending about the stator 29 and an upper end radially inwardly extending annular flange 35 which overlies the top of the stator ring 29. At its lower end, the rotor part 34 projects downwardly below the stator 29 and has locked thereto a closure and retainer ring 37 which is of an outside diameter to fit within a rabbet groove 38 providing a downwardly facing shoulder to which the ring 37 is held as by means of a securing pin 39. The retainer ring 37 projects radially inwardly to underlie the stator ring 29 and has a radially inwardly opening keying slot 40 within which is engaged, as a key, the radially outwardly projecting portion of the set screw 18, thereby locking the rotor portion 33 corotatably with the caster 10.

Damping is effected by means of a viscous damping medium substantially filling a shear film space gap working chamber 41 defined between annular, axially elongate cylindrical concentric working surfaces 42 and 43 facing one another in radially spaced relation on respectively the stator 29 and the rotor part 34. The spaced relation between the working surfaces 42 and 43 is calculated to provide a shear film of the viscous damping medium therebetween to act as a shear coupling which will yieldably resist relative rotary movements of the working surfaces. By way of example the damping medium may be a silicone fluid of 100,000 centistokes. In a miniature size suitable for damping shimmying of wheelchair casters, and utilizing viscous medium of the kind and viscosity identified, a desirable shear film space gap for the working chamber 41 may be about 1/32" where the length of the working surface 42 of the stator 29 is about 5/32". Leakage of the viscous damping medium from the working chamber 41 is prevented by dynamic sealing means conveniently comprising respective elastic "O" rings 44 at the opposite ends of the working chamber and seated in suitable rabbet grooves 45 provided in the top and bottom outside corners of the stator part 29 and dimensioned to assure that the O-rings engage not only sealingly in the grooves but also against the opposing working surface 43 of the rotor part 34.

By preference, the damper parts 29, 34 and 37 are formed from solid plastic material which can be molded with a high degree of accuracy into the final shape, thus requiring no machining, and permitting assembly of the parts with the simplest tools and little labor, for low-cost manufacture. In assembling the parts, the relatively thickly viscous damping medium is applied in an ample coating to the working surface 42 of the stator part 29, and with the sealing rings 44 in place the stator part is inserted into the cavity of the rotor part 34 providing a housing therefor. Such assembly may be effected with the aid of a tapered assembly ring temporarily mounted in the rabbet groove 38 and a pusher applied for axial assembly pressure to the outer end of the stator part 29, as an assembly expedient. The viscous damping medium may serve as an assembly-assisting lubricant for the sealing rings 44 during the assembling maneuver. After the stator ring 29 has been assembled with the rotor part 34, the ring part 37 is assembled with the rotor part 34 and is pinned in place by means of the pin 39 or a plurality of such pins at circumferentially spaced intervals, thus completing assembly of the damper 28.

Joining of the damper 28 with the caster 10 is easily effected by relatively axially assembling the damper about the axle 14, before assembly of the bushing 20 with the caster, by aligning the keying slot 40 with the outward projection of the set screw 18 by which the thrust base ring 17 has been secured to the axle 14. The bushing 20 may then be assembled with the axle 14 and keyed by means of the slots 31 and the keys 32 with the rotor 29. Of course, if preferred, the assembly routine may be reversed in that the damper 28 may first be assembled with the bushing 20 and then the caster assembled with the bushing and the damper. In any event, after assembly of the damper and bushing with respect to the axle 14, the bushing is locked in place against axial separation from the caster by means of the washers 24 and the snap ring 25. The assembly as thus completed, may then be joined with the strut or chair leg 21, ready for service.

Figure 4:
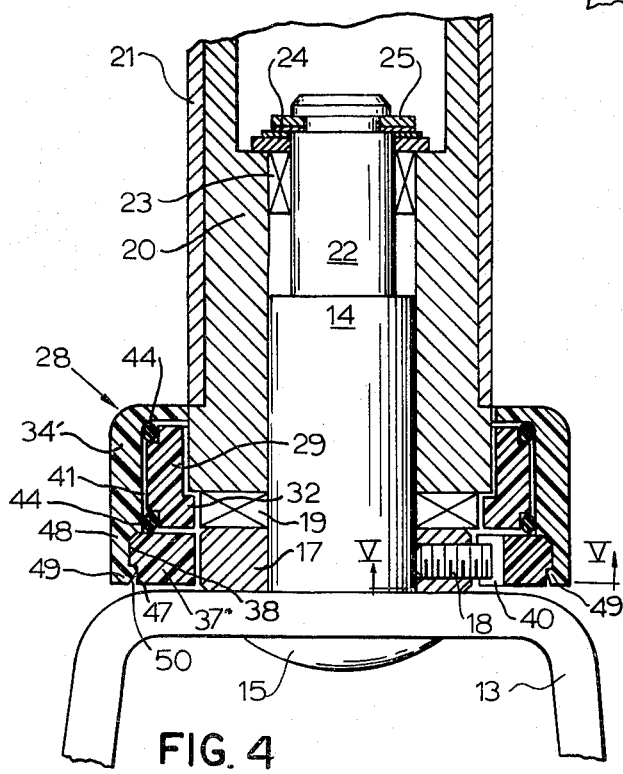
FIG. 4 is a vertical sectional detail view similar to FIG. 2 but showing a slight modification.
Figure 5:
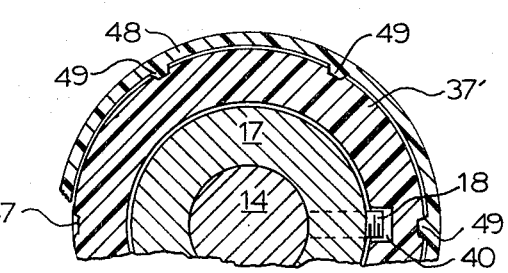
FIG. 5 is a fragmentary sectional detail view taken substantially along the line V—V of FIG. 4.

In a slightly modified arrangement as shown in FIGS. 4 and 5, assembly of the retainer closure ring 37' with the rotor part 34' is simplified, eliminating the need for the securing pins 39. To this end, the ring 37' is provided along its lower outside corner with a set of downwardly and outwardly opening shallow sockets 47 which may be, for example, six in number equally spaced circumferentially. For snappingly retainingly engaging in the sockets 47, the rotor part 34' has about the rabbet groove 38' a stiffly resiliently flexible annular skirt flange 48 which has an inside diameter slightly larger than the outside diameter of the ring part 37' and is provided on its lower inside corner with radially inwardly projecting retainer lugs 49 complementary to the sockets 47 and adapted to be engaged with the sockets in snap-on-fit. To facilitate assembly, the lugs 49 are provided with respective leading cam surfaces 50. Through this arrangement, the ring part 37' is adapted to be assembled with the rotor part 34' by simply aligning the sockets 47 and the lugs 49 and then pressing the parts 34' and 37' axially together until the ring part 37' is seated in the rabbet groove 38' and the lugs 49 snapped retainingly into the sockets 47. Thereby, the parts 34' and 37' are held positively assembled together and corotative for efficient functioning of the rotor assembly. Other components of the structure as depicted in FIGS. 4 and 5 are the same as in FIGS. 1-3 and therefore identical reference characters will be understood to identify identical elements and description thereof will not be repeated although the reference characters have been applied to FIGS. 4 and 5.

From the foregoing it will be appreciated that the damper 28 permits normal functioning of the caster 10, but efficiently attenuates any tendency for the caster to shimmy in the running mode.

Although modifications and changes may be suggested by those skilled in the art, it is the intention of the inventor to embody within the patent warranted hereon all changes and modifications as reasonably and properly come within the scope of his contribution to the art.

I claim:

1. In a damper comprising a small diameter axially elongate annular assembly especially useful for attenuating shimmy of a wheelchair caster relative to a caster-supported cylindrical chair leg member to which the caster is mounted for swiveling about a vertical axis:

a first axially extending annular damper portion arranged to engage concentrically about said leg member and having at one end radially inwardly directed means for holding said first annular damper portion fixed against rotation with respect to said leg member;

said first damper portion having an annular axially elongate cylindrical first working surface of substantial axial length and arranged to be coaxial with said axis;

a second axially extending annular damper portion arranged to fit concentrically about said leg member and having at one end radially inwardly directed means for holding said second damper portion fixedly corotative with the caster;

said second damper portion having an annular axially elongate second working surface complementary to and facing toward said first working surface of said first damper portion;

said working surfaces being in narrowly radially spaced apart relation and thereby defining an axially elongated essentially straight working chamber gap having axially opposite ends;

a viscous damping medium in said working chamber gap and providing a viscous shear coupling for yieldably resisting relative rotary movements of said working surfaces;

dynamic sealing ring means carried by and between said damper portions and extending across and sealing said axially opposite ends of said working chamber gap against leakage of said damping medium;

said first annular damper portion comprising an axially extending ring member having opposite ends, and said second damper portion comprising a pair of annular parts one of which is axially elongate and of generally L-shape in cross section and the other of which is a retainer ring, means securing said pair of annular parts corotatively together and defining a cavity which is complementary to said ring member and in which the ring member is received with said working surfaces is opposed relation, and radially extending surfaces of said parts extending across said opposite ends of said gap and also across said opposite ends of said ring member;

said ring member having respective sealing ring grooves at the ends of said first working surface and opening not only toward said second working surface but also toward said radially extending surfaces, and said sealing ring means engaging sealingly in said grooves and projecting from said grooves into sealing engagement with the respective opposite end portions of said second working surface and also with said radially extending surfaces; and said retainer ring projecting radially inwardly to underly said ring member and having a radially inwardly opening keying slot within which is adapted to be engaged, as a key, the radially outwardly projecting portion of a set screw carried by the caster for thereby locking said second damper portion corotatively with the caster.

2. A structure according to claim 1, wherein said means for securing said parts together comprises a radially extending securing pin.

3. A structure according to claim 1, wherein said L-shaped part is formed from plastic material and said means for securing said parts together comprises snap-together interlocking retaining lugs on said L-shaped part at the opposite end of said second working surface, and said lugs being received in recesses in said retainer ring.

4. A wheelchair leg and a caster supporting the leg and adapted to swivel about the axis of the leg, and a small diameter axially elongate annular damper assembly for attenuating shimmy of the caster relative to the leg, comprising:

a first annular damper portion arranged to engage concentrically about said leg and having at one end radially inwardly directed keying means for interengagement with keying means on said leg for holding said first annular damper portion fixed against rotation with respect to said leg;

said first annular damper portion having an annular vertical axially elongate radially outwardly facing cylindrical first working surface of substantial axial length and arranged to be coaxial with said vertical axis;

a second annular damper portion arranged to fit concentrically about said leg and about said first damper portion and having at one end radially inwardly directed keying means extending past said first annular portion for interengagement with keying means on said caster for holding said second annular damper portion fixedly corotative with the caster;

said second annular damper portion having an annular axially elongate second working surface complementary to and facing radially inwardly toward said first working surface;

said working surfaces being in narrowly radially spaced apart relation and thereby defining an axially elongated working chamber gap having axially opposite ends;

a viscous damping medium in said working chamber gap and providing a viscous shear coupling for yieldably resisting relative rotary movements of said working surfaces;

dynamic sealing ring means carried by and between said damper portions and extending across and sealing said axially opposite ends of said working chamber gap against leakage of said damping medium;

said first annular damper portion comprising an axially extending ring member having opposite ends, and said second damper portion comprising a pair of annular parts one of which is axially elongate and of generally L-shape in cross section and the other of which is a retainer ring, means securing said pair of annular parts corotatively together and defining a cavity which is complementary to said ring member and in which the ring member is received with said working surfaces in opposed relation, and radially extending surfaces of said parts extending across said opposite ends of said gap and also across said opposite ends of said ring member;

said ring member has respective sealing ring grooves at the ends of said first working surface and opening not only toward said second working surface but also toward said radially extending surfaces, and said sealing ring means engaging sealingly in said grooves and projecting from said grooves into sealing engagement with the respective opposite end portions of said second working surface and also with said radially extending surfaces;

and said retainer ring projecting radially inwardly to underly said ring member and having a radially inwardly facing edge, said caster having an axle and an annular member directly fixed to said axle and surrounded by said retainer ring and having a radially outwardly facing edge confronting said retainer ring edge, and said keying means connecting said edges corotatively to thereby lock said caster and said second damper portion corotatively.

5. A structure according to claim 4, wherein said means for securing said parts together comprises a radially extending securing pin.

6. A structure according to claim 4, wherein said means for securing said parts together comprises snap-together interlocking retaining lugs on the end of said generally L-shape part opposite to said annular flange, and said lugs received in interlock recesses in said retainer ring.

* * * * *

UNITED STATES PATENT AND TRADEMARK OFFICE
CERTIFICATE OF CORRECTION

PATENT NO. : 4,432,116

DATED : February 21, 1984

INVENTOR(S) : John C. Schultz

It is certified that error appears in the above—identified patent and that said Letters Patent is hereby corrected as shown below:

Column 1, line 13, change "tye" to read --the--.

Column 6, line 1, change "is" to read --in--.

Signed and Sealed this

Second Day of October 1984

[SEAL]

Attest:

Attesting Officer

GERALD J. MOSSINGHOFF

Commissioner of Patents and Trademarks